R. N. McCLURE.
AIRLESS VEHICLE TIRE.
APPLICATION FILED MAY 9, 1921.
1,438,604.
Patented Dec. 12, 1922.
2 SHEETS—SHEET 1.
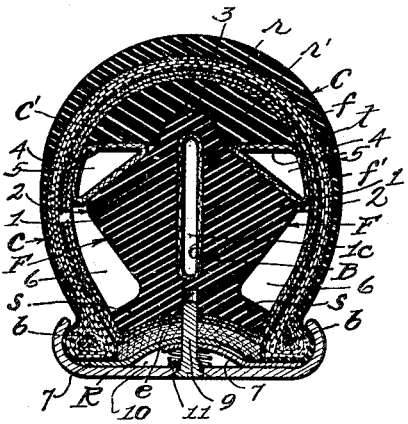
Fig. 1.
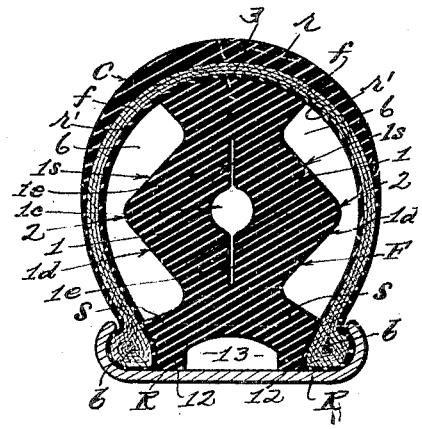
Fig. 2.
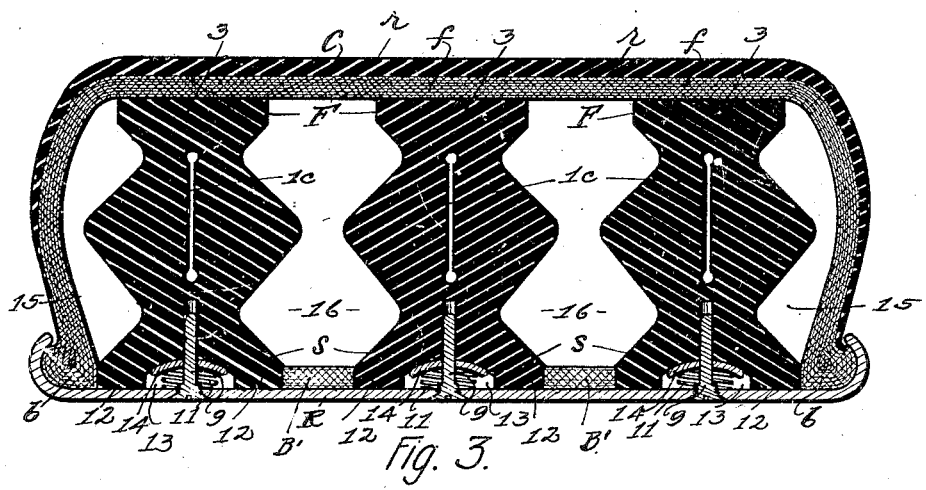
Fig. 3.
Fig. 4.
INVENTOR.
Rodney N. McClure
BY
ATTORNEYS.

R. N. McCLURE.
AIRLESS VEHICLE TIRE.
APPLICATION FILED MAY 9, 1921.

1,438,604.

Patented Dec. 12, 1922.
2 SHEETS—SHEET 2.

INVENTOR.
Rodney N. McClure
BY
ATTORNEYS.

Patented Dec. 12, 1922.                                                        1,438,604

UNITED STATES PATENT OFFICE.

RODNEY N. McCLURE, OF LOS ANGELES, CALIFORNIA.

AIRLESS VEHICLE TIRE.

Application filed May 9, 1921. Serial No. 468,109.

*To all whom it may concern:*

Be it known that I, RODNEY N. MCCLURE, a citizen of the United States, and a resident of Los Angeles, in the county of Los Angeles and State of California, have invented new and useful Improvements in Airless Vehicle Tires, of which the following is a specification.

This invention relates in general to cushion tires for motor propelled vehicles and the like, and more particularly to a form of tire having all of the advantages of a pneumatic tire, and adapted to provide a maximum amount of resiliency and ample strength for supporting the weight of the vehicle, and yet possessing cushioning qualities favorably comparable with pneumatic tires, when used on such vehicles.

The main object is to provide in an airless tire, in connection with the usual outer casing which is reinforced by several layers of fabric, an annular shoe or filler which is continuous throughout its length, and is adapted to be inserted in the casing and on the metal rim of the wheel, for holding the casing extended in the same manner as when an inner tube is used in the casing, and held extended by compressed air.

It will be understood in the consideration of this invention that the air filled tube which is now in common use is subject to puncture and other troubles, and possesses disadvantages which often cause delay and inconvenience to the operators of the vehicle, and it is an object of my invention to provide a tire which is incapable of puncture or injury, to the extent that delays may be encountered and which will generally afford greater satisfaction to the users, and longer life, and yet possess ample resiliency and strength for use on pleasure or freight vehicles.

To this end I have provided, and will hereinafter describe, a form of tire which includes the outer casing and an annular filler member, which may be separable from said casing or vulcanized thereto, as may be found desirable and expedient, depending upon the requirements of use in such a tire. I have provided a filler member with an annular or arcuate cavity extending completely around and in the center thereof, and having a maximum area at the center. The outer and inner portions of said annular shoe or filler are adapted to engage respectively, the inner wall of the outer casing, and the outer surface of the wheel rim and the cross section of said filler is of such character that annular air spaces or cavities will be provided within the outer casing, on each side of the filler and between the inner portion thereof and the wheel rim. These cavities afford space within the tire casing to permit the distension or compression of the filler, as the successive portions of the tire come into contact with the surface of the road and the full weight of the vehicle is pressed on the tire, and serves to compress and distend the filler laterally. The fillers have a maximum cross section area midway of their inner and outer portions, and the central annular cavity therein bisects the said central portion and permits the opposite sides of said central portion, when the shoe is compressed by the weight of the vehicle on the tire, to expand outwardly in the direction of the side walls of the outer casing.

The expansion and contraction of the filler in the manner stated, during the movement of the vehicle, causes a displacement of the air within the annular cavities of the tire and the air therein therefore serves more or less as a cushioning element, as the area of said cavities is increased as the case may be, due to the expansion or contraction of the filler.

Means is also provided on the inner portion of said filler member for holding the clincher beads of the outer casing in firm contact with the wheel rim. In order to prevent the creeping of the filler on the rim, I have also provided studs extending outwardly and radially from the wheel rim into the inner portion of the filler. For this purpose it will be understood also that I have provided a filler which is adaptable to pleasure and heavy duty vehicles, and in the latter type of vehicle a plurality of the fillers may be provided within a casing and spaced apart, so that the heavy duty vehicles may have a tire of width equal to those used on the solid truck tires.

I have illustrated in the accompanying drawings several modifications of my invention, showing the adaptation of the same to different uses, in which:

Fig. 1 is a cross sectional view of a tire casing with a filler shoe of resilient character vulcanized to the interior thereof.

Fig. 2 is a cross sectional view of a tire with my improvements therein, showing a separable filler shoe.

Fig. 3 is a cross sectional view of a truck tire for heavy duty, showing a plurality of the separable filler shoes mounted in spaced relation therein.

Fig. 4 is a fragmentary perspective view of a tire of the character shown in Fig. 1, broken away at points to show the several elements of the tire.

Figure 5:
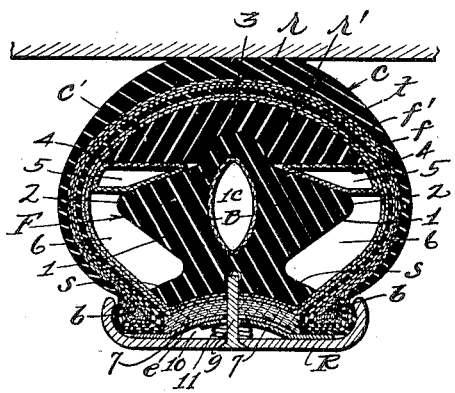
Fig. 5 is a transverse cross section of a tire of the character shown in Fig. 1, illustrating the relative positions of the several parts when compressed, due to the weight of the vehicle.

Referring now more particularly to Figs. 1 and 4, C is an outer casing with the usual outer coating of rubber $r$, a plurality of layers of fabric $f$ being provided on the inside of the tread $r$, a plurality of spiral wrappings of tape T interiorly of said fabric, and the usual inner layers of fabric $f'$. The inner portions of the tire are provided with the usual beads $b, b$, for engagement with the vehicle rim R. On the inside of the casing C adjacent to the inner fabric layers $f'$, I provide an annular ring of resilient rubber $r'$ which is of segmental cross section, and the inner surface of which is flat and substantially parallels the outer surface of the rim R. Contrary to usual practice in outer tire casings, in which the space between the beads $b, b$, is open, I have closed this space with a plurality of layers of fabric and rubber alternately, arranged in the usual manner, as at $e$, the inner layers of fabric $f'$ being continued around the portion $e$.

Intermediate the portion $e$ and the ring $r'$ I have provided a filler core F which has an enlarged central portion provided with an annular cavity $1^c$ of elongated cross section and surrounded by a hollow canvas belt B which separates the central portion of the core F into triangular side portions 1, 1, the corners 2, 2, of said side portions are disposed transversely of the tire casing, on a line parallel to the surface of the rim R, and the outer sides of the core are inclined upwardly and downwardly from the corners, so that the maximum width of the core will be on a line cutting the corners 2, 2.

In this form of tire the outer portion of the core F has an annular bead 3 which is adapted to seat in a corresponding groove in the annular ring $r'$, and the triangular spaces between the outer inclined surface of the core F the inner flat surfaces of the ring $r'$ and the adjacent portions of the inner wall of the casing C are filled by hollow fabric rings 4, 4, of triangular cross section and having annular cavities 5, 5, therein. The inner portion of the core F has an annular shoe S with a concave surface adapted to conform to and to fit on the portion $e$ of the casing C.

Now, it will be understood that the casing C, the segmental ring $r'$, the core F, the fabric tubes 4, 4, are all vulcanized together and form an integral structure and the form of core shown provides spaces 6, 6 at the sides and on the interior of the casing C to allow for the expansion and distension of the core F when the casing and core are compressed by the weight of the vehicle. The air within said spaces and within the tubes 4, 4 serves also as a cushioning element when the casing and core are depressed. In the manufacture of the tire the core F is formed in two like sections, the line separation between which will cut the central cavity $1^c$, the two portions thereafter being vulcanized together to form an integral core. In some cases it may be found desirable to use the core in two parts instead of vulcanizing the parts together as stated.

The portion $e$ of the casing is concave and is adapted to receive a plurality of over-lapping flat springs 7, 7 which may be suitably attached to the rim R beneath beads $b, b$ of the casing. The inner ends of said springs are provided with slots 8, as shown in Fig. 4, for receiving studs 9 which are adapted to be threaded into the rim R and extended inwardly through the portion $e$ and into corresponding recesses of the core F, for the purpose of preventing the creeping of the tire on the rim. Usually three or four of these studs are sufficient for the purpose. The recesses in the core F are of sufficient depth to permit of the compression of the core F over the ends of the studs so that there will be no wear on the core. I may also provide in the spaces 10, adjacent to the rim R and between said rim and the springs 7, coil springs 11 carried on the studs 9 and adapted to compress between the flat springs 7 and the rim when the tire is compressed by the weight of the vehicle thereon. These may or may not be necessary but will serve to provide ample resiliency for the portion $e$ of the casing and to restrict said portion to its normal concave form.

The form of tire shown in Fig. 2 comprises the usual outer casing C, with the rubber tread $r$, a plurality of layers of fabric $f$, an inner coating of rubber $r'$, and the usual clincher beads $b, b$ for holding the casing on the wheel rim R. The core F in this form of tire comprises the central side portions 1, 1 similar in character to the construction shown in Fig. 1, and the central cavity $1^c$, of annular character and of circular cross section, with inner and outer extensions 1ᵉ, 1ᵉ. The portions 1, 1, have the outer inclined sides 1ˢ, 1ˢ, and the inner inclined sides 1ᵈ, and the corners 2, 2, which are spaced from the inner walls of the casing when the tire is extended.

The outer portion 3 of the core, in this form of device is substantially wider than that shown in Fig. 1 and has a curved surface conforming to and adapted to engage the inner wall of the casing C. The inner portion or shoe S of the core F has annular portions 12, 12, the sides of which conform to the inner surface of the beads b, b, and the inner surface of which are flat and are adapted to engage the outer surface of the wheel rim R. An annular space 13 is provided between the portions 12, 12, of the shoe and the rim, which permits the distension and compression of the shoe when the weight of the vehicle is placed on the tire, and serves to force the beads b, b, more firmly into the curved flanges of the rim, and thus to hold the tire firmly in position on the rim. When the tire is in use on a vehicle, it will be understood that successive portions of the core F will be distended as the wheels move over the road, and the corner portions 2, 2 of the core will be forced outwardly into contact with or close to the side walls of the casing C, thus varying the area and form of the side cavities 6, 6 on opposite sides of the core. The central cavity 1ᶜ in the core permits of the lateral distension of the central portion of the core F, and affords a maximum resiliency to the core.

In the manufacture of the core F, as shown in Fig. 2, the core is preferably formed in two like parts vulcanized together in the center, so as to form an integral annular filler separable from the casing C, and adapted to be placed therein or removed therefrom, as inner tubes are now inserted in or removed from said casings.

In Fig. 3 I have shown a form of tire embodying the features of my invention, which is adapted particularly to heavy vehicles, and includes an outer casing C of wide cross section, with an outer tread of rubber r, the inner layers of fabric f, beads b, b, adapted to be supported on the wide wheel rim R. This type of tire may be of the character shown in Fig. 2 or may embody some of the features shown in Fig. 1 or in Fig. 2, the portions 3 of the cores F being flat on their outer surfaces for contact with the inner wall of the casing, and the portions 12 of said cores being adapted to seat on the rim R. The central cavities 1ᶜ of the cores are of slightly different form from the cavities shown in Figs. 1 and 2, but this is immaterial, and may be changed to suit conditions. In this form of tire, I have found it desirable to employ the studs 9, shown in Fig. 1, together with the coil springs 11 on said studs, which are adapted to compress between the rim R and suitable washers 14 held against the inner concave surfaces of the shoes S of the cores, and within the spaces 13, as shown in Fig. 3. The cores F for heavy duty purposes are spaced apart sufficiently to provide for the distension and compression of the cores when the weight of the vehicle is on the tire, and annular air spaces 15, 15 and 16, 16 (see Fig. 3) are provided at the sides of the cores for the same purpose.

As in the other forms of tire shown, the inner cavities 1ᶜ of the cores F may have the fabric tube B, if desired, or necessary but in the separable cores F, as shown in Figs. 2 and 3, it is not thought that the same will be necessary as in the case of the integral structure, shown in Fig. 1. For use on a truck tire, one or more of the fillers may be inserted or removed at will for replacement, or other purposes and with the cores F made as shown with a maximum area at the greatest point of distension, now at the center, and midway of the inner and outer portions ample resiliency will be afforded which will compare favorably with pneumatic tires and afford longer life to the tire.

It will be understood that the exact form of the cores F may be changed to suit conditions, and that said cores, being continuous and of integral character should last as long as the casing C and afford infinitely more satisfaction and security to the users than other types of fillers or cores, in which a series of short segments are provided. In the use of a single continuous ring or core, as shown in the drawings, the friction will be minimized between the casing and the core, and the surface between the casing and the core being of a maximum area and preventing creeping of the core within the casing due to the traction wave within the tire.

In the form of tire shown in Fig. 1, the inner layers of fabric f' may constitute an inner casing C' which is preferably formed integrally with the portions r', 4, 4, the core F and the inclosure e, so that the entire inner structure of the tire may be a separate unit from the outer casing and capable of being inserted in and removed therefrom at will.

Figure 6:
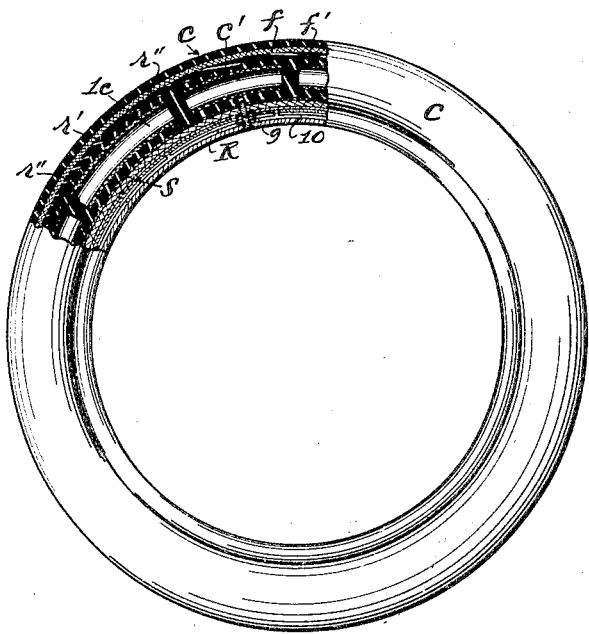
Fig. 6 is a full view of a tire of the character shown in Fig. 5, partly in section to show the cavities within the filler member separated by transverse ribs, as an optional method of forming the filler.

As shown in Figs. 5 and 6, the cavities 1ᶜ of the filler member F, instead of being annular as shown in Fig. 1, may be arcuate in form and separated by transverse ribs r'', whereby a plurality of cavities be provided in the tire instead of a single cavity. The ribs r'' will obviously serve to reinforce the structure of the filler and at the same time to subdivide the filler into a plurality of like sections, yieldable locally and independently as the wheel is rotated, and the weight of the vehicle is placed on the successive portions of the tire. It will be understood in connection with my improvements that in the form of tire shown, the area and form of the spaces 1°, 5, and 6 within the inner casing will be changed during the rotation of the tire as successive portions of the tire are brought into contact with the ground, and the weight of the vehicle is placed thereon. When the weight of the vehicle is placed on any portion of the tire, the tendency of the tire is to flatten out laterally, as shown in Fig. 5, and it will be observed by reference to this fact that the area and form are completely changed from that shown in Figs. 1 and 2.

Now, this being the case, the volume of air and the pressure within the said spaces is correspondingly changed, and the natural tendency is to restore the tire to its normal position by reason of the displacement of the air, and the increase in pressure within said spaces.

In the form of heavy duty tire shown in Fig. 3, the cores F may be held in spaced relation at the bottom by means of spacer bands B', B' formed of alternate layers of fabric and rubber fitting between the shoes S, S, S and if needed similar bands may be also provided between the portions 3, 3, 3, of the cores at the outer peripheries.

It will be readily apparent that I may alter the construction shown within the scope of the appended claims without departing from the spirit of my invention.

What I claim is:

1. An airless tire including a continuous annular core adapted to be held within a tire casing and on a wheel rim and having enlarged casing and rim engaging surfaces, and a maximum cross sectional area at points midway of said casing and rim engaging surfaces.

2. An airless tire including a continuous annular core adapted to be held within a tire casing and on a wheel rim and having enlarged casing and rim engaging surfaces, and a maximum cross sectional area at points midway of said casing and rim engaging surfaces, an annular cavity being provided in the central portion of said core, as described.

3. In an airless tire, a casing, a continuous annular core in said casing having a central annular cavity therein, and a maximum cross sectional area around said cavity, an inner annular shoe integral therewith having the sides thereof formed to seat the inner portions of the beads of the casing, and annular portions spaced apart for engagement with the wheel rim and providing an air space between said rim engaging portions, and other air spaces at the sides of the core, as described.

4. In an airless tire comprising an outer casing having clincher beads thereon and a continuous annular core in combination with a rim for supporting said casing, said core formed of two like portions vulcanized together and provided with a central cavity in the center, and side portions arranged to provide air spaces between said core and the walls of said casing.

5. In a tire comprising a casing and a core in combination with a metal rim for supporting said casing, said core having a continuous annular cavity therein, inner and outer portions engaging the walls and beads of said casing respectively, and a central enlarged portion surrounding said cavity and spaced from the sides of said casing for providing air spaces between the core and casing, whereby said core may be distended and compressed when the weight of the vehicle is placed thereon.

6. In a tire comprising a casing and a core in combination with a wheel rim for supporting said casing, said core having bearing portions on its inner and outer peripheries engaging portions of said casing, and a central portion of greater area than said bearing portions, and normally spaced from the sides of said casing for providing air spaces between the core and casing and permitting the distension or compression of said core due to the weight of the vehicle thereon.

7. In a tire comprising a casing and a core in combination of a wheel rim for supporting said casing, said core having an outer bearing portion adapted to engage the central portion of said casing, and inner bearing portions adapted to engage the inner beaded portions of said casing, and a central enlarged portion having its sides normally spaced from the sides of said casing for providing air spaces therearound, to permit the distension and compression of said core laterally in said casing.

8. In a tire comprising a casing and a core in combination with a wheel rim, said core being annular and having an outer bearing portion adapted to engage the central portion of said casing, and inner bearing portions adapted to engage the inner beaded portions of said casing, and a central enlarged portion having its sides normally spaced from the sides of said casing for providing air spaces therearound, to permit the distension and compression of said core laterally in said casing, said core being provided with an annular cavity midway of said inner and outer bearing portions whereby the opposite sides of said central portion may spread in opposite directions.

9. In a tire comprising a casing and a core in combination with a wheel rim, said core having an outer bearing portion adapted to engage the central portion of said casing, and inner bearing portions adapted to engage the inner beaded portions of said casing, and a central enlarged portion having its sides normally spaced apart from the sides of said casing for providing air spaces therearound, to permit the distension and compression of said core laterally in said casing, said core being provided with an annular cavity midway of said inner and outer bearing portions, whereby the opposite sides of said central portion may spread in opposite directions, said annular cavity being of greatest width midway of its inner and outer peripheries.

RODNEY N. McCLURE.

Witnesses:
J. W. SHEELEY,
LUTHER L. MACK.